United States Patent [19]

Röber et al.

[11] Patent Number: 5,474,822
[45] Date of Patent: Dec. 12, 1995

[54] MULTILAYER PLASTIC PIPE

[75] Inventors: Stefan Röber; Hans Jadamus, both of Marl; Michael Böer, Oer-Erkenschwick; Roland Feinauer, Marl; Hans-Dieter Herrmann, Marl; Hans Ries, Marl, all of Germany

[73] Assignee: Huels Aktiengesellschaft, Marl, Germany

[21] Appl. No.: 187,740

[22] Filed: Jan. 28, 1994

[30] Foreign Application Priority Data

Oct. 25, 1993 [DE] Germany ............ 43 36 289.3

[51] Int. Cl.$^6$ ............... B32B 1/08; F16L 9/14
[52] U.S. Cl. ............ 428/36.91; 428/36.6; 428/922; 428/421; 428/474.4; 428/474.9; 428/475.2; 428/475.8; 428/476.3; 428/480; 138/137; 138/DIG. 7; 138/118; 138/140; 138/141; 206/524.5
[58] Field of Search ............ 428/36.91, 474.4, 428/475.2, 474.9, 475.5, 475.8, 480.421, 476.3, 36.7, 36.6, 922; 138/137, DIG. 7, 118, 140, 141, 177; 206/524.5; 215/12.1; 220/86.2

[56] References Cited

U.S. PATENT DOCUMENTS

| | | | |
|---|---|---|---|
| 5,258,213 | 11/1993 | Mügge et al. | 428/36.91 |
| 5,313,987 | 5/1994 | Rober et al. | 138/137 |

FOREIGN PATENT DOCUMENTS

| | | |
|---|---|---|
| 0509212 | 10/1992 | European Pat. Off. |
| 0523644 | 1/1993 | European Pat. Off. |
| 0542184 | 5/1993 | European Pat. Off. |
| 0551094 | 7/1993 | European Pat. Off. |
| 0567947 | 11/1993 | European Pat. Off. |
| 0569681 | 11/1993 | European Pat. Off. |
| 0569683 | 11/1993 | European Pat. Off. |

OTHER PUBLICATIONS

Research Disclosure, No. 321, Jan. 1991, pp. 68A–68B, "CONTROL OF FUNCTIONALITY IN GLUTARIMIDE POLYMERS", MP Halden—Abberton, et al.

Primary Examiner—Charles R. Nold
Attorney, Agent, or Firm—Oblon, Spivak, McClelland, Maier & Neustadt

[57] ABSTRACT

A plastic pipe having improved resistance, inter alia, to methanol-containing fuels and improved mechanical properties comprising:

(I) an outer layer made of a moulding compound based on polyamide, (II) an intermediate layer adjacent to the outer layer and made of a moulding compound based on a mixture of:
  (a) of from 95 to 99% by weight of a linear crystalline polyester, and
  (b) of from 1 to 5% by weight of a compound having at least two isocyanate groups,
  wherein the isocyanate groups originating from component (IIb) are present in the mixture of (IIa) and (IIb) in a concentration of from 0.03 to 0.3% by weight, (III) an intermediate layer made of a moulding compound based on polyamide, (IV) an intermediate layer adjacent to the inner layer and made of a moulding compound comprising a mixture of:
  (a) from 50 to 90% by weight of a polyamide, and
  (b) from 10 to 50% by weight of a poly(alkyl)acrylic ester, (v) an inner layer made of a moulding compound based on polyvinylidene fluoride, wherein said layers (I) to (V) are each adhesively bonded to one another.

24 Claims, No Drawings

MULTILAYER PLASTIC PIPE

BACKGROUND OF THE INVENTION

1. Field of the Invention

The invention relates to a multilayer plastic pipe comprising at least five layers adhesively bonded to each other.

2. Background of the Invention

Plastic pipes made from polyamide have previously been employed for a variety of applications. It is known that in order to achieve their objective, the pipes must be, inter alia, inert to the medium flowing in them, and must be resistant to high and low temperatures and mechanical stresses.

Single-layer pipes are not always capable of satisfying the necessary requirements. In the case of transport of, for example, aliphatic or aromatic solvents, fuels or the like, they exhibit considerable disadvantages, such as a poor barrier action to the medium, undesired changes in dimension or inadequate resistance to mechanical stresses.

Attempts to overcome these disadvantages have included the use of multilayer pipes (DE-A 35 10 395; DE-A 37 15 251; DE-A 38 21 723; DE-A 40 01 125 and DE-A 40 01 126). However, practical implementation of these proposals has shown that, although some disadvantages can be overcome, the overall property profile is still unsatisfactory.

French Patent 2 602 515 describes a two-layer pipe comprising an outer layer of nylon 11 and an inner layer of plasticized polyvinylidene fluoride. However, investigations have shown that the barrier action to the flowing medium is unsatisfactory.

German Patent 38 27 092 describes a multilayer plastic pipe which comprises, from the inside outwards, layers of polyamide, polyvinyl alcohol, polyamide and polyester. The polyester is only used in a thin outer layer so as to achieve higher short-term heat deformation resistance. Further, it is known to those skilled in the art that by far the majority of polymers, including polyamides and polyesters, are incompatible with one another, since no adhesion is achieved between the laminate layers in the production of multilayer composites. An adhesive bond between the individual polymer layers is absolutely essential in industrial applications, however.

In particular, permeation of methanol-containing fuels has only been reduced to an inadequate extent by means of the abovementioned proposals.

Reduction in permeation by using novel intermediate layers is therefore of crucial importance because, in particular, the legally permitted emission values are constantly being reduced.

SUMMARY OF THE INVENTION

Accordingly, one object of the invention is to provide a polyamide pipe having a good barrier action with respect to the transported medium, in particular to methanol-containing fuels, satisfactory dimensional stability, for example at high and low temperatures, and also satisfactory resistance to mechanical stresses.

The present inventors have now found that this object is achieved by a multilayer plastic pipe which comprises at least:

(I) an outer layer made of a moulding composition based on polyamide, (II) an intermediate layer adjacent to the outer layer and made of a moulding composition based on a mixture of:

(a) from 95 to 99% by weight of a linear crystalline polyester, and (b) from 1 to 5% by weight of a composition having at least two isocyanate groups, wherein the isocyanate groups originating from component IIb are present in component (I) in a concentration of from 0.03 to 0.3% by weight, (III) an intermediate layer made of a moulding composition based on polyamide, (IV) an intermediate layer adjacent to the inner layer and made of a moulding composition based on a mixture of (a) from 50 to 90% by weight of a polyamide, and (b) from 10 to 50% by weight of a poly(alkyl)acrylic ester (V) an inner layer made of a moulding composition based on polyvinylidene fluoride, where the layers (I)–(V) are each adhesively bonded to one another.

In accordance with the present invention, the outer layer (I) and also layers (III) and (IVa) are suitably aliphatic homo- and copolyamides. The components (I), (III) and (IVa) can be identical or different. Suitable polyamides include polyamides 4.6, 6.6, 6.12, 8.10, 10.10 and the like. Preferably, polyamides 6, 10.12, 11, 12 and 12.12 are used. The designation of the polyamides corresponds to the international standard, the first number(s) indicating the number of carbon atoms in the starting diamine and the last number(s) indicating the number of carbon atoms in the dicarboxylic acid. If only one number is given, it indicates that the starting material was an $\alpha,\omega$-amino-carboxylic acid or the lactam derived therefrom (H. Domininghaus, Die Kunststoffe und ihre Eigenschaften [Plastics and their properties], page 272, VDI-Verlag (1976)).

Suitable copolyamides can contain, for example, adipic acid, sebacic acid, suberic acid, isophthalic acid or terephthalic acid as co-acid or bis(4-aminocyclohexyl)methane, trimethylhexamethylenediamine, hexamethylenediamine or the like as co-diamine.

These polyamides can be prepared by conventional methods (for example, D. B. Jacobs, J. Zimmermann, Polymerization Processes, pp. 424–67; Interscience Publishers, New York (1977); DE-B 21 52 194, both incorporated herein by reference).

Other suitable polyamides useful in accordance with the present invention are mixed aliphatic/aromatic polycondensates, as described, for example, in U.S. Pat. Nos. 2,071,250; 2,071,251; 2,130,523; 2,130,948; 2,241,322; 2,312,966; 2,512,606 and 3,393,210; and in Kirk-Othmer, Encyclopedia of Chemical Technology, 3rd Edn., Vol. 18, pages 328 and 435, Wiley & Sons (1982). Other suitable polycondensates include poly(ether ester amides) and poly(ether amides). Products of this type are described, for example, in DE-A 27 12 987; DE-A 25 23 991 and DE-A 30 06 961.

The number average molecular weight of the polyamides is greater than 5,000 g/mol, preferably greater than 10,000 g/mol, corresponding to a relative viscosity ($\eta_{rel}$) in the range of from 1.5 to 2.8.

Preferred polyamides for the layers according to (I) and (III) are ones which contain <50% of amino terminal groups, in particular >80% of amino terminal groups.

The linear crystalline polyesters (component IIa) have the following basic structure:

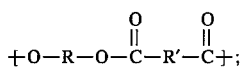

wherein R is a divalent, branched or unbranched, aliphatic and/or cycloaliphatic radical having from 2 to 12, preferably from 2 to 8, carbon atoms in the carbon chain, and R' is a divalent aromatic radical having from 6 to 20, preferably from 8 to 12, carbon atoms in the carbon skeleton. These polyesters are conventionally formed by condensing a diol component (HO—R—OH) and an aromatic dicarboxylic acid or diester component

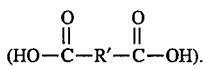

Examples of suitable diols include ethylene glycol, trimethylene glycol, tetramethylene glycol, hexamethylene glycol, neopentylglycol, cyclohexanedimethanol and the like. Up to 25 mol % of the diol may be replaced by a second diol from those mentioned above or by a diol having the following general formula

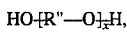

where R" is a divalent radical having from 2 to 4 carbon atoms and x is an integer of from 2 to 50. Preferred diols according to this general formula are diethylene glycol or dibutylene glycol.

Suitable aromatic dicarboxylic acids include, for example, terephthalic acid, isophthalic acid, 1,4-, 1,5-, 2,6- and 2,7-naphthalenedicarboxylic acid, diphenic acid, and diphenyl ether 4,4'-dicarboxylic acid. Terephthalic acid is preferred. Up to 20 mol % of these dicarboxylic acids may be replaced by aliphatic dicarboxylic acids such as, for example, succinic acid, maleic acid, fumaric acid, sebacic acid, dodecanedioic acid, inter alia.

The linear crystalline polyesters can be prepared according to conventional methods (DE-A 24 07 155, DE-A 24 07 156 and Ullmanns Encyclopaedia der technischen Chemie [Ullmann's Encyclopaedia of Industrial Chemistry], 4th Edition, Volume 19, pages 65 ff., Verlag Chemie GmbH, Weinheim, 1980).

Suitable polyesters useful in accordance with the present invention have a viscosity index (J value) in the range from 80 to 240 cm³/g.

The polyamides of the outer layer (I) and of the intermediate layer (III) and of the component (IVa), and the polyester of the component (IIa) may contain up to 40% by weight of other thermoplastics, provided that these do not adversely affect the properties according to the invention. Suitable thermoplastics include polycarbonate (H. Schnell, Chemistry and Physics of Polycarbonates, Interscience Publishers, New York (1981)), acrylonitrile/styrene/butadiene copolymers (Houben-Weyl, Methoden der organischen Chemie [Methods of Organic Chemistry], Volume 14/1, Georg Thieme Verlag Stuttgart, pp. 393–406; Ullmanns Encyclopädie der technischen Chemie [Ullmann's Encyclopaedia of Industrial Chemistry], 4th Edition, Volume 19, Verlag Chemie GmbH, Weinheim (1981), pp. 279–284), acrylonitrile/styrene/acrylate copolymers (Ullmanns Encyclopädie der technischen Chemie [Ullmann's Encyclopaedia of Industrial Chemistry], 4th Edition, Volume 19, Verlag Chemie GmbH, Weinheim (1981), pp. 277–295), acrylonitrile/styrene copolymers (Ullmanns Encyclopädie der technischen Chemie [Ullmann's Encyclopaedia of Industrial Chemistry], 4th Edition, Volume 19, Verlag Chemie GmbH, Weinheim (1981), pp. 273 ff.) or polyphenylene ethers (DE-A 32 24 691 and DE-A 32 24 692, U.S. Pat. Nos. 3,306,874; 3,306,875 and 4,028,341).

If necessary, the polyamides and/or polyesters can be impact-modified. Suitable modifiers include, for example, ethylene/propylene or ethylene/propylene/diene copolymers (EP-A 295 076), polypentenylene, polyoctenylene or random or block copolymers made of alkenyl-aromatic compounds with aliphatic olefins or dienes (EP-A 261 748). Alternatively, the modifier can be an impact-modifying rubber such as core/shell rubbers having a tough, resilient core of (meth)acrylate, butadiene or styrene/butadiene rubber having glass transition temperatures Tg <–10° C., where the core may be crosslinked. The shell may be built up of styrene and/or methyl methacrylate and/or further unsaturated monomers (DE-A 21 44 528 and DE-A 37 28 685). The proportion of impact-modifying component should be selected so that the desired properties are not impaired.

Suitable compounds useful in accordance with the present invention as component (IIb) include compounds which contain at least two isocyanate groups. Particularly suitable compounds include aromatic and (cyclo)aliphatic isocyanates such as, for example, 1,4-phenylene diisocyanate, 2,4-tolylene diisocyanate, 2,6-tolylene diisocyanate, 1,5-naphthalene diisocyanate, 1,6-hexamethylene diisocyanate, diphenylmethane 2,4-diisocyanate, diphenylmethane 4,4'-diisocyanate, diphenylmethane 2,2'-diisocyanate, isophorone diisocyanate, 1,4-tetramethylene diisocyanate, 1,12-dodecane diisocyanate. Further examples are cyclohexane 1,3-diisocyanate, cyclohexane 1,4-diisocyanate, cyclobutane 1,3-diisocyanate, 2,4-hexahydrotolylene diisocyanate, 2,6-hexahydrotolylene diisocyanate, hexahydro-1,3-phenylene diisocyanate, hexahydro-1,4-phenylene diisocyanate, norbonane diisocyanate, p- or m-xylylene diisocyanate, perhydro-2,4-diphenylmethane diisocyanate and perhydro-4,4'-diphenylmethane diisocyanate.

Compounds which are particularly preferred as component (IIb) are isophorone diisocyanate and products of the reaction thereof with itself and with suitable reactants such as, for example, α,ω-diols having 2–10 carbon atoms in the carbon chain. These products are obtained, for example, by reacting at least two molecules of isophorone diisocyanate such that two isocyanate groups react to form a biuret group. Alternatively, these products can be obtained, for example, by reacting two isophorone diisocyanate molecules with one molecule of diol, such that one isocyanate group of each isophorone diisocyanate forms a urethane linkage with one of the hydroxyl groups of the diol. Examples of particularly suitable diols for this purpose include butanediol and diethylene glycol.

Compounds containing more than two, and preferably exactly three, isocyanate groups can similarly be used as component (IIb). Suitable examples include triphenylmethane 4,4',4"-triisocyanate, and also the reaction products of the diisocyanates mentioned above for component (IIb), in particular triisocyanurates of these diisocyanates, such as the triisocyanurate which is formed by reacting three molecules of hexamethylene diisocyanate. Particular preference is given to the triisocyanurate which is formed by reacting three molecules of isophorone diisocyanate.

The isocyanate groups of component (IIb) may be in blocked form. The isocyanate groups can be blocked by conventional methods (See for example, Paint Resin (1988) 58(5), 18–19). For example, the isocyanate groups may be blocked by reacting the isocyanate groups with diols, pyrazoles, oximes, in particular ketoximes, and lactams, in particular caprolactam.

Preferably component (IIb) is a mixture of a compound having two isocyanate groups and a compound having more than two isocyanate groups. The molar ratio of the compound having two isocyanate groups to the compound having more than two isocyanate groups is in the range of from 20 to 80:of from 80 to 20, preferably of from 40 to 50:of from 60 to 50.

The preparation of the moulding composition for the layer (II) is carried out by conventional and known processes by mixing melts of the components (IIa) and (IIb) in a mixer which provides good kneading, such as a twin-screw extruder, at temperatures which depend on the melting points of components (IIa) and (IIb), in general at temperatures between 200° and 300° C.

The moulding compound for the layer (II) can be prepared using conventional catalysts for the processing of isocyanates.

Prior to the production of the multilayer pipes, the moulding composition for the layer (II) should be stored in a dry place and with exclusion of atmospheric moisture.

The above-described preparation of the moulding composition for the layer (II) can also be carried out directly in a feed extruder of the coextrusion unit or injection-moulding unit which is used for the production of the multilayer pipes, so that the moulding compound for the layer (II) can be made into a layer of the multilayer pipe directly after its preparation, without any intermediate storage. In the case of coextrusion, the processing conditions in the production of the multilayer pipes should be selected in such a way that the melts are laid on top of one another at sufficiently high pressure.

The moulding composition for the intermediate layer (II) contains from 95 to 99% by weight, preferably from 96 to 98% by weight, of polyester and from 1 to 5% by weight, preferably from 2 to 4% by weight, based on the total weight of layer (II), of compounds having isocyanate groups.

The amount used of compounds having isocyanate groups is such that the mixture of the components (IIa) and (IIb) has an isocyanate group concentration in the range from 0.03 to 0.3% by weight, preferably in the range from 0.04 to 0.2% by weight, based on the total weight of the mixture.

In addition to the polyamide component (IVa), the intermediate layer (IV) also contains component (IVb). Suitable compounds useful in the present invention as component (IVb) include poly(alkyl)acrylic esters or derivatives thereof having from 1 to 6 carbon atoms in the carbon chain of the alkyl radical or the alcohol. Preferably, the alkyl radical and the alcohol contain methyl groups as their alkyl chains. Preferably component (IVb) is, inter alia, polymethyl methacrylate or polybutyl methacrylate.

Copolymers of the poly(alkyl)acrylic esters can also be used as component (IVb). Thus, up to 50% by weight, preferably from 5 to 30% by weight, of the alkyl (meth)acrylate can be replaced by another monomer such as, for example, (meth)acrylic acid, hexyl (meth)acrylate, styrene, maleic anhydride or the like. Preferably, copolymers of methyl (meth)acrylate with a proportion of <30% by weight, preferably from 12 to 18% by weight, of styrene and of ≦20% by weight, preferably from 8 to 12% by weight, of maleic anhydride are used.

Suitable derivatives of poly(alkyl)acrylic esters which can be used as component (IVb) include polymers comprising the following basic building blocks:

i) <100% by weight, preferably from 6.5 to 60% by weight, of

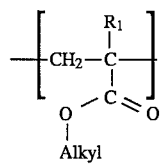

ii) <100% by weight, preferably from 20 to 90% by weight, of

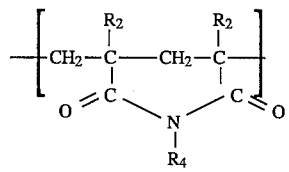

iii) <20% by weight, preferably from 2 to 15% by weight, of

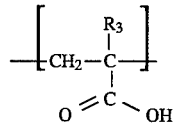

iv) <20% by weight, preferably from 1.5 to 12% by weight, of

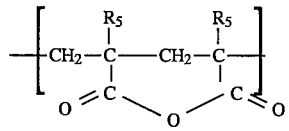

wherein Alkyl is methyl, ethyl, propyl, butyl, hexyl; and $R_1$ to $R_5$, the same or different, are hydrogen or $(C_nH_{2n+1})$ wherein n is an integer of from 1 to 6.

Preferably alkyl and $R_1$ to $R_5$ are each methyl.

These polymers are polyglutarimides, since they are poly(alkyl)acrylic esters in which two adjacent carboxylate groups have been reacted to form a cyclic imide. The imide formation is preferably carried out using ammonia or primary amines such as methylamine. Polyglutarimides can be prepared according to conventional methods (Hans R. Kricheldorf, Handbook of Polymer Synthesis, Part A, Verlag Marcel Dekker Inc. New York-Basel-Hong Kong, page 223 ff.; H. G. Elias, Makromoleküle [Macromolecules], Hüthig und Wepf Verlag Basel Heidelberg-New York; U.S. Pat. Nos. 2,146,209 and 4,246,374).

Suitable poly(alkyl)acrylic esters have a melt flow index of <30 g/10 min, preferably from 0.3 to 15 g/10 min.

To increase the low-temperature impact strength, the polyglutarimides can additionally contain appropriate modifiers. Suitable modifiers include core/shell polymers having a polybutyl acrylate core and a shell of polymethyl methacrylate and/or polyglutarimide. In addition to the modifiers mentioned, other conventional modifiers can be included.

The moulding composition of the layer (IV) can be prepared by conventional processes including by mixing melts of the components (IVa) and (IVb) in a mixer having a good kneading action, such as a twin-screw extruder, at temperatures which depend on the melting points of the components (IVa) and (IVb), generally at temperatures between 230° and 330° C.

The moulding composition for the layer (IV) can also be prepared directly in a feed extruder which is used in the coextrusion facility or injection-moulding facility employed for the production of the multilayer pipes, so that the moulding composition for the layer (IV) can be made into a layer of the multilayer pipe directly after its preparation, without any intermediate storage.

The components (IVa) and (IVb) are suitably used in a weight ratio of from 50 to 90:of from 50 to 10, preferably of from 60 to 80:of from 40 to 20.

The inner layer (V) contains, in particular, polyvinylidene fluoride, which is preferably used in plasticizer-free form. Polyvinylidene fluoride can be prepared according to conventional methods (Hans R. Kricheldorf, Handbook of Polymer Synthesis, Part A, Verlag Marcel Dekker Inc. New York-Basel-Hong Kong, p. 191 ff.; Kunststoff Handbuch [Plastics Handbook], 1st Edition, Volume XI, Carl Hanser Verlag Munich (1971), p. 403 ff.).

According to the invention, copolymers based on polyvinylidene fluoride which have up to 40% by weight of other monomers may also be incorporated. Suitable examples include trifluoroethylene, ethylene, propane and hexafluoropropene. Suitable polyvinylidene fluoride has a melt flow index of <17 g/10 min, preferably from 2 to 13 g/10 min (DIN 53 735).

The moulding compositions for the layers (I) to (V) may incorporate conventional auxiliaries and additives such as, for example, flameproofing agents, stabilizers, plasticizers, processing aids, viscosity improvers, fillers, particularly those for improving the conductivity, pigments or the like. The amount of the said agents is to be metered in such that the desired properties are not seriously affected.

The manufacture of the multilayer pipes is carried out in a known manner, as described, for example, in the references discussed above. The pipes are preferably produced by coextrusion.

Preference is given to multilayer pipes according to the invention in which the inner layer (V) is electrically conductive. Good electrical conductivity is achieved by the addition of up to 15% by weight of, for example, conductive carbon black, carbon fibers or the like.

In a multilayer pipe according to the invention having an external diameter of 8 mm and a total wall thickness of 1 mm, the layer thicknesses may be, for example, from the outside to the inside 0.70 mm, 0.05 mm, 0.10 mm, 0.05 mm and 0.10 mm. According to the invention (that is layer (I), layer (II), layer (III), layer (IV) and layer (V), respectively) other layer thickness distributions are possible, for example with a thicker inner layer (V) of, for example, 0.3 mm.

The multilayer pipes according to the invention have outstanding resistance to, and good barrier action against diffusion of, (petro)chemical substances, solvents and fuels. In addition, the adjacent layers are adhesively bonded to one another, so that no delamination of the adjacent layers from one another takes place, for example, during thermal expansion or flexing of a pipe.

The plastic pipes of the invention are preferably used for transporting (petro)chemical substances. For example, in the motor vehicle sector, the plastic pipes of the present invention can be used to construct lines for carrying brake, cooling and hydraulic fluids and also fuel. A further use of the multilayer pipes is for the production of hollow articles such as motor vehicle tanks or filling ports.

Having generally described this invention, a further understanding can be obtained by reference to certain specific examples which are provided herein for purposes of illustration only and are not intended to be limiting unless otherwise specified.

EXAMPLES

The stated parameters were determined by the following measurement methods.

The determination of the solution viscosity (relative viscosity $\eta_{rel}$) of the polyamides was carried out using a 0.5% strength by weight m-cresol solution at 25° C. in accordance with DIN 53 727/ISO 307.

For the determination of the amino terminal groups, 1 g of the polyamides was dissolved in 50 ml of m-cresol at 25° C. The solution was titrated potentiometrically with perchloric acid.

For the determination of the carboxyl terminal groups in the polyamides, 1 g of polycondensate was dissolved in 50 ml of benzyl alcohol under a blanket of nitrogen at 165° C. The dissolution time was a maximum of 20 minutes. The solution was titrated with a solution of KOH in ethylene glycol (0.05 mol of KOH/l ) against phenolphthalein until the colour changes.

The determination of the solution viscosity (viscosity index J) of the polyesters was carried out in a 0.5% strength by weight phenol/o-dichlorobenzene solution (weight ratio 1:1) at 25° C. in accordance with DIN 53 728/ISO 1628/5-part 5.

For the determination of the isocyanate groups, 6 g of the component (II) (polyester, isocyanate) was dissolved at 180° C. in a mixture of dichlorobenzene/dibutylamine (80:20% by volume). The solution was titrated at 20° C. with 10% strength hydrochloric acid against bromophenol as indicator (DIN 53 185).

The determination of the melt flow index of the poly-(alkyl)acrylic esters was carried out at 230° C. and under a load of 3.8 kg (DIN 53 735).

The determination of the melt flow index of the polyvinylidene fluorides was carried out at 230° C. and under a load of 5 kg (DIN 53 735).

The testing of the ease of mechanical separation at the interface was carried out using a metal wedge (edge angle: 5°; loading weight: 2.5 kg); this test attempts to separate the material interface layer to be tested. If separation takes place at the interface between the components, the adhesion is poor. If, by contrast, the separation takes place wholly or partly within one of the two components, good adhesion is present.

The determination of the diffusion of fuel components was carried out on pipes using a fuel mixture (fuel M 15: 42.5 parts by volume of isooctane, 42.5 parts by volume of toluene and 15 parts by volume of methanol) at 23° C. and 50% atmospheric humidity. The samples, having a length of 200 mm, were filled with the fuel mixture and were connected to a filled stock tank during the measurement. Diffusion was determined as the loss in weight by diffusion over time (measurement every 24 hours). The measure indicated was the weight loss recorded per unit area, measured when the diffusion process has achieved equilibrium, i.e. when the weight loss determined per 24 hours no longer changes with time.

Examples denoted by letters are not according to the invention.

A. Component I.

PA 1: Polyamide 12 ($\eta_{rel}$: 2.1; plasticizer content: 0; amino terminal group content: 9 mmol/kg; carboxyl terminal group content: 48 mmol/kg; VESTAMID® L 2140-HÜLS AG)

PA 2: Polyamide 12 ($\eta_{rel}$: 2.1; plasticizer content per 100 parts by weight of polyamide: 15 parts by weight of N-n-butylbenzenesulphonamide; amino terminal group content: 9 mmol/kg; carboxyl terminal group content: 48 mmol/kg; VESTAMID® L 2124-HÜLS AG)

PA 3: Polyamide 12 ($\eta_{rel}$: 2.1; plasticizer content: 0; 50 mmol/kg of amino terminal groups; 8 mmol/kg of carboxyl terminal groups)

PA 4: Polyamide 12 ($\eta_{rel}$: 2.1; plasticizer content per 100 parts of polyamide: 15 parts by weight of N-n-butylbenzenesulphonamide; 50 mmol/kg of amino terminal groups; 8 mmol/kg of carboxyl terminal groups)

B. Component (II).

B 1: Polybutylene terephthalate (J value: 165 cm³/g; NCO content=0; VESTODUR® 3000-HÜLS AG)

B 2: Mixture of
a. 98% by weight of polybutylene terephthalate (J value: 115 cm³/g; VESTODUR® 1000-HÜLS AG) and
b. 2% by weight of a mixture comprising
b.1 50% by weight of a compound which has been prepared from 2 mol of isophorone diisocyanate and 1 mol of diethylene glycol, the bonding in each case taking place via a urethane linkage and the remaining NCO groups being blocked by caprolactam, and
b.2 50% by weight of the isocyanurate of isophorone diisocyanate (VESTANAT® T 1890-HÜLS AG)
NCO group concentration in component (II): 0.08% by weight B 3: Mixture of
a. 96% by weight of polybutylene terephthalate (J value: 115 cm³/g; VESTODUR® 1000-HÜLS AG) and
b. 4% by weight of a mixture comprising
b.1 50% by weight of a compound which has been prepared from 2 mol of isophorone diisocyanate and 1 mol of diethylene glycol, the bonding in each case taking place via a urethane linkage and the remaining NCO groups being blocked by caprolactam, and
b.2 50% by weight of the isocyanurate of isophorone diisocyanate (VESTANAT® T 1890-HÜLS AG)
NCO group concentration in component II: 0.16% by weight B 4: Mixture of
a. 97% by weight of polybutylene terephthalate (J value: 115 cm³/g; VESTODUR® 1000-HÜLS AG) and
b. 3% by weight of a mixture comprising
b.1 40% by weight of isophorone diisocyanate, blocked by caprolactam, and
b.2 60% by weight of the isocyanurate of isophorone diisocyanate, the remaining NCO groups being blocked by caprolactam.
NCO group concentration in component II.: 0.18% by weight C. Component III.
(see under component I.)

D. Component IV.

D 1: Mixture of
a. 70 parts by weight of polyamide 12 ($\eta_{rel}$: 2.1; plasticizer content: 0; amino terminal groups: 9 mmol/kg; carboxyl terminal groups: 48 mmol/kg; VESTID® L 2140-HÜLS AG) and
b. 30 parts by weight of a polymer (melt flow index: 0.4 g/10 min) built up of the following basic building blocks
i) 55% by weight of

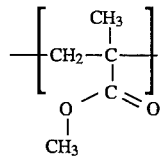

ii) 30% by weight of

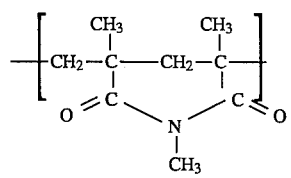

iii) 5% by weight of

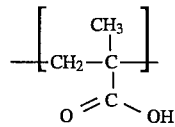

iv) 10% by weight of

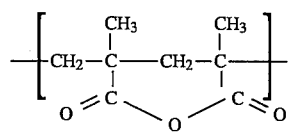

D 2: Mixture of
a. 50 parts by weight of polyamide 12 ($\eta_{rel}$: 2.1; plasticizer content: 0; amino terminal groups: 9 mmol/kg; carboxyl terminal groups: 48 mmol/kg; VESTAMID® L 2140-HÜLS AG) and
b. 50 parts by weight of a polymer (melt flow index: 0.4 g/10 min) built up of the following basic building blocks
i) 55% by weight of

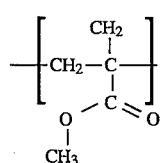

ii) 30% by weight of

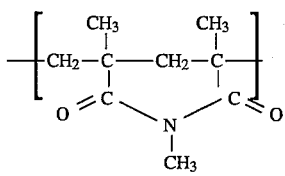

iii) 5% by weight of

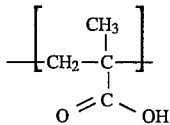

iv) 10% by weight of

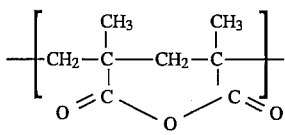

E. Component V.

PVDF 1: Polyvinylidene fluoride (melt flow index: 13 g/10 min, DYFLOR® LE-HÜLS AG)
PVDF 2: Polyvinylidene fluoride (melt flow index: 8.5 g/10 min; 6 parts by weight of commercial conductive carbon black per 100 parts by weight of PVDF; DYFLOR® EE-HÜLS AG)

F. Production of the multilayer pipes

The pipes were produced in a laboratory extrusion unit using a five-layer tool. The barrel temperatures were 230° C. (PA 1, PA 2, PA 3, PA 4), 250° C. (PVDF 1, PVDF 2, B 1, B 2, B 3, B 4) and 260° C. (D 1, D 2).

The layer thicknesses of the five-layer pipes were, from the outside to the inside: 0.65 mm; 0.08 mm; 0.10 mm; 0.07 mm; 0.10 mm.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A multilayer plastic pipe, which comprises:
  (I) an outer layer comprising a moulding composition based on polyamide;
  (II) a first intermediate layer adjacent to the outer layer comprising a moulding composition based on a mixture of:
    (a) from 95 to 99% by weight, based on the total weight of said layer (II), of a linear crystalline polyester,
    (b) from 1 to 5% by weight, based on the total weight of said layer (II), of a compound having at least two isocyanate groups,
    wherein the isocyanate groups originating from component (IIb) are present in the mixture of (IIa) and (IIb) in a concentration of from 0.03 to 0.3% by weight;
  (III) a second intermediate layer adjacent to the first intermediate layer comprising a moulding composition based on polyamide;
  (IV) a third intermediate layer adjacent to said second intermediate layer and an inner layer comprising a moulding composition comprising a mixture of:
    a) from 50 to 90% by weight of a polyamide, and
    b) from 10 to 50% by weight of a poly(alkyl)acrylic ester; and
  (V) an inner layer comprising a moulding composition based on polyvinylidene fluoride, and
  wherein each of said layers (I) to (V) is adhesively bonded to the respectively adjacent layer.

2. The multilayer plastic pipe according to claim 1, wherein, in said polyamide comprising the layer (I) or (III) or both, at least 50% by weight of all terminal groups present are amino terminal groups.

3. The multilayer plastic pipe according to claim 1, wherein said intermediate layer (II) comprises a moulding composition based on a mixture of
  (a) of from 96 to 98% by weight, based on the total weight of said layer (II) of a linear crystalline polyester, and
  (b) of from 2 to 4% by weight, based on the total weight

TABLE

| Experiment | Outer layer (I) | Intermediate layers (II), (III), (IV) | | | Inner layer (V) | Diffusion [g/d m²] at 23° C. | Adjacent layers mechanically separable after storage in fuel* |
|---|---|---|---|---|---|---|---|
| A | PA 1 | PA 1 | PA 1 | PA 1 | PA 1 | 30 | no |
| B | PA 2 | PA 2 | PA 2 | PA 2 | PA 2 | 90 | no |
| C | PA 2 | B 1 | PA 2 | D 1 | PVDF 1 | 0.8 | yes (II from III and II from I) |
| D | PA 1 | B 2 | PA 1 | PA 1 | PVDF 1 | 0.7 | yes (IV from V) |
| 1 | PA 3 | B 2 | PA 3 | D 1 | PVDF 1 | 0.7 | no |
| 2 | PA 4 | B 2 | PA 4 | D 1 | PVDF 2 | 0.8 | no |
| 3 | PA 3 | B 3 | PA 3 | D 2 | PVDF 1 | 0.7 | no |
| 4 | PA 4 | B 4 | PA 4 | D 2 | PVDF 2 | 0.8 | no |

Storage at 23° C. for 5 days in standard fuel M 15 of said layer (II) of a compound having at least two isocyanate groups.

4. The multilayer plastic pipe according to claim 1, wherein said isocyanate groups originating from component (IIb) are present in the mixture of (IIa) and (IIb) in a concentration from 0.04 to 0.2% by weight.

5. The multilayer plastic pipe according to claim 1, wherein said component (IIb) comprises a mixture of a compound having two isocyanate groups and a compound having more than two isocyanate groups.

6. The multilayer plastic pipe according to claim 5, wherein said component (IIb) comprises isophorone diisocyanate or a compound derived therefrom by reaction with itself or with diols.

7. The multilayer plastic pipe according to claim 6, wherein said component (IIb) comprises an isocyanurate derived from isophorone diisocyanate.

8. The multilayer plastic pipe according to claim 6, wherein said component (IIb) has isocyanate groups blocked by a lactam.

9. The multilayer plastic pipe according to claim 1, wherein said intermediate layer (IV) comprises a moulding composition based on a mixture of:

(a) of from 60 to 80% by weight of a polyamide, and
(b) of from 20 to 40% by weight of a poly(alkyl)acrylic ester.

10. The multilayer plastic pipe according to claim 1, wherein said component (IVb) is a copolymer of methyl methacrylate, styrene and maleic anhydride.

11. The multilayer plastic pipe according to claim 1, wherein said component (IVb) comprises the following basic building blocks:

i) <100% by weight of

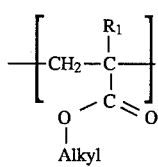

ii) <100% by weight of

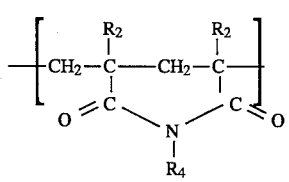

iii) <20% by weight of

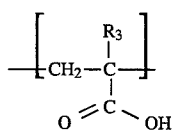

iv) <20% by weight of

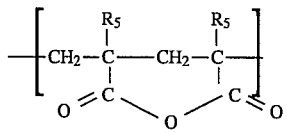

wherein Alkyl is methyl, ethyl, propyl, butyl, or hexyl; and $R_1$ to $R_5$, identical or different, are hydrogen or $(C_nH_{2n+1})$ where n is an integer of from 1 to 6.

12. The multilayer plastic pipe according to claim 11, wherein said component (IVb) comprises the following basic building blocks:

i) from 6.5 to 60% by weight of

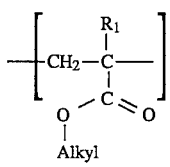

ii) from 20 to 90% by weight of

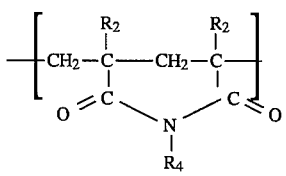

iii) from 2 to 15% by weight of

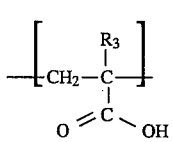

iv) from 1.5 to 12% by weight of

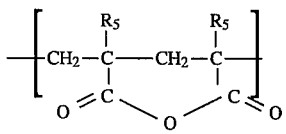

wherein Alkyl is methyl, ethyl, propyl, butyl, or hexyl; and $R_1$ to $R_5$, identical or different, are hydrogen or $(C_nH_{2n+1})$ where n is an integer of from 1 to 6.

13. The multilayer plastic pipe according to claim 11, wherein Alkyl and $R_1$ to $R_5$ are each methyl.

14. The multilayer plastic pipe according to claim 1, wherein said inner layer (V) comprises a moulding compound based on a polyvinylidene fluoride having a melt flow index of <17 g/10 min.

15. The multilayer plastic pipe according to claim 14, wherein said inner layer (V) comprises a moulding compound based on a polyvinylidene fluoride having a melt flow index of from 2 to 13 g/10 min.

16. The multilayer plastic pipe according to claim 1, wherein said inner layer (V) comprises a moulding compound based on a polyvinylidene fluoride copolymer.

17. The multilayer plastic pipe according to claim 1, wherein said inner layer (V) is electrically conductive and has a surface resistance of $<10^9$ Ω.

18. A method for transporting a petrochemical substance, comprising flowing said petrochemical substance through a multilayer plastic pipe, which comprises:
(I) an outer layer comprising a moulding composition based on polyamide;
(II) a first intermediate layer adjacent to the outer layer comprising a moulding composition based on a mixture of:
(a) from 95 to 99% by weight based on the total weight of said layer (II), of a linear crystalline polyester, and
(b) from 1 to 5% by weight, based on the total weight of said layer (II), of a compound having at least two isocyanate groups,
wherein the isocyanate groups originating from component (IIb) are present in the mixture of (IIa) and (IIb) in a concentration of from 0.03 to 0.3% by weight;
(III) a second intermediate layer adjacent to the first intermediate layer comprising a moulding composition based on polyamide,
(IV) a third intermediate layer adjacent to said second intermediate layer and an inner layer comprising a moulding composition comprising a mixture of:
(a) from 50 to 90% by weight of the polyamide, and
(b) from 10 to 50% by weight of a poly(alkyl)acrylic ester; and
(V) an inner layer comprising a moulding composition based on polyvinylidene fluoride; and
wherein each of said layers (I) to (V) is adhesively bonded to the respectively adjacent layer.

19. A method for transporting brake, cooling and hydraulic fluids or fuel in a motor vehicle comprising flowing said fluid or fuel through a multilayer plastic pipe, which comprises:
(I) an outer layer comprising a moulding composition based on polyamide;
(II) a first intermediate layer adjacent to the outer layer comprising a moulding composition based on a mixture of:
(a) from 95 to 99% by weight, based on the total weight of said layer (II), of a linear crystalline polyester, and
(b) from 1 to 5% by weight, based on the total weight of said layer (II), of a compound having at least two isocyanate groups,
wherein the isocyanate groups originated from component (IIb) are present in the mixture of (IIa) and (IIb) in a concentration from 0.03 to 0.3% by weight;
(III) a second intermediate layer adjacent to the first intermediate layer comprising a moulding composition based on polyamide;
(IV) a third intermediate layer adjacent to the second intermediate layer and an inner layer comprising a moulding composition comprising a mixture of:
(a) from 50 to 90% by weight of a polyamide, and
(b) from 10 to 50% by weight of poly(alkyl)acrylic ester; and
(V) an inner layer comprising a moulding composition based on polyvinylidene fluoride; and
wherein each of said layers (I) to (V) is adhesively bonded to the respectively adjacent layer.

20. A hollow article, comprising a multilayer plastic pipe, which comprises:
(I) an outer layer comprising a moulding composition based on polyamide;
(II) a first intermediate layer adjacent to the outer layer comprising a moulding composition based on a mixture of:
(a) from 95 to 99% by weight, based on the total weight of said layer (II), of a linear crystalline polyester, and
(b) from 1 to 5% by weight, based on the total weight of said layer (II), of a compound having at least two isocyanate groups,
wherein the isocyanate groups originating from component (IIb) are present in the mixture of (IIa) and (IIb) in a concentration of from 0.03 to 0.3% by weight;
(III) a second intermediate layer adjacent to the first intermediate layer comprising a moulding composition based on polyamide;
(IV) a third intermediate layer adjacent to said second intermediate layer and the inner layer comprising a moulding composition comprising a mixture of:
(a) from 50 to 90% by weight of a polyamide, and
(b) from 10 to 50% by weight of a poly(alkyl)acrylic ester; and
(V) an inner layer comprising a moulding composition based on polyvinylidene fluoride; and
wherein each of said layers (I) to (V) is adhesively bonded to the respectively adjacent layer.

21. A motor vehicle filling port or tank, comprising a multilayer plastic pipe, which comprises:
(I) an outer layer comprising a moulding composition based on polyamide;
(II) a first intermediate layer adjacent to the outer layer comprising a moulding composition based on a mixture of:
(a) from 95 to 99% by weight, based on the total weight of said layer (II), of a linear crystalline polyester, and
(b) from 1 to 5% by weight, based on the total weight of said layer (II), of a compound having at least two isocyanate groups,
wherein the isocyanate groups originating from component (IIb) are present in the mixture of (IIa) and (IIb) in a concentration of from 0.03 to 0.3% by weight;
(III) a second intermediate layer adjacent to the first intermediate layer comprising a moulding composition based on polyamide;
(IV) a third intermediate layer adjacent to the second intermediate layer and the inner layer comprising a moulding composition comprising the mixture of:
(a) from 50 to 90% by weight of a polyamide, and
(b) from 10 to 50% by weight of a poly(alkyl)acrylic ester; and
(V) an inner layer comprising a moulding composition based on polyvinylidene fluoride; and
wherein each of said layers (I) to (V) is adhesively bonded to the respectively adjacent layer.

22. The multilayers plastic pipe according to claim 1, wherein said polyamide of layers (I), III) and IVa) is the same or different and is selected from the group consisting of polyamides 4.6, 6, 6.6, 6.12, 8.10, 10.10, 10.12, 11, 12 and 12.12.

23. The multilayer plastic pipe according to claim 22, wherein said polyamide is selected from the group consisting of polyamides 6, 10.12, 11, 12 and 12.12.

24. The multilayer plastic pipe according to claim 1, wherein said polyamide of layers (I), (III) and IVa) is the same or different and has an average molecular weight of greater than 10,000 g/mol.

* * * * *